United States Patent
Feichtinger et al.

(10) Patent No.: US 9,254,603 B2
(45) Date of Patent: Feb. 9, 2016

(54) APPARATUS FOR PROCESSING PLASTIC MATERIAL

(71) Applicant: Erema Engineering Recycling Maschinen und Anlagen Gesellschaft M.B.H., Ansfelden (AT)

(72) Inventors: Klaus Feichtinger, Linz (AT); Manfred Hackl, Linz-Urfahr (AT)

(73) Assignee: EREMA ENGINEERING RECYCLING MASCHINEN UND ANLAGEN GESELLSCHAFT M.B.H., Ansfelden (AT)

( * ) Notice: Subject to any disclaimer, the term of this patent is extended or adjusted under 35 U.S.C. 154(b) by 0 days.

(21) Appl. No.: 14/351,677

(22) PCT Filed: Oct. 12, 2012

(86) PCT No.: PCT/AT2012/050159
§ 371 (c)(1),
(2) Date: Apr. 14, 2014

(87) PCT Pub. No.: WO2013/052987
PCT Pub. Date: Apr. 18, 2013

(65) Prior Publication Data
US 2014/0234461 A1   Aug. 21, 2014

(30) Foreign Application Priority Data
Oct. 14, 2011   (AT) .................. A 1503/2011

(51) Int. Cl.
*B29B 17/04*   (2006.01)
*B29C 47/40*   (2006.01)
(Continued)

(52) U.S. Cl.
CPC ............ *B29C 47/40* (2013.01); *B01F 15/0289* (2013.01); *B02C 18/086* (2013.01);
(Continued)

(58) Field of Classification Search
CPC .... B29C 47/40; B29C 47/38; B29C 47/1027; B29C 47/0011; B02C 18/086; B29B 17/0026; B29B 17/0412; B29B 13/10; B01F 15/0289

USPC ............. 425/202, 197; 264/340, 328.17, 37.1
See application file for complete search history.

(56) References Cited

U.S. PATENT DOCUMENTS 2,927,007 A   3/1960   Kaether
3,867,194 A   2/1975   Straube
(Continued)

FOREIGN PATENT DOCUMENTS

AT   400315 B   12/1995
CN   101186103 A   5/2008
(Continued)

OTHER PUBLICATIONS

International Search Report mailed Feb. 6, 2013, from PCT Application No. PCT/AT2012/050159 (9 pages).
(Continued)

*Primary Examiner* — James Sanders
*Assistant Examiner* — Leith S Shafi
(74) *Attorney, Agent, or Firm* — Kilpatrick Townsend & Stockton LLP

(57) ABSTRACT

Disclosed is an apparatus for the processing of plastics, with a container with a mixing implement rotatable around an axis of rotation, wherein, in a side wall, an aperture is formed, through which the plastics material can be removed, and a conveyor, with a screw rotating in a housing, wherein the imaginary continuation of the longitudinal axis of the conveyor in a direction opposite to the direction of conveying passes the axis of rotation, and wherein the L/D ratio of the screw is ≥7, and wherein the setting angle (γ) of the radially outermost mixing implement, closest to the base, complies with the following relationship:

$\gamma = k \ast d + K$, where
d is the diameter of the screw in mm,
K is a factor in the range from 15 to 35,
k is a factor in the range from 0.08 to 0.2.

30 Claims, 2 Drawing Sheets

(51) Int. Cl.
| | |
|---|---|
| *B01F 15/02* | (2006.01) |
| *B29B 13/10* | (2006.01) |
| *B29B 17/00* | (2006.01) |
| *B02C 18/08* | (2006.01) |
| *B29C 47/00* | (2006.01) |
| *B29C 47/38* | (2006.01) |
| *B29C 47/10* | (2006.01) |
| *B29K 105/26* | (2006.01) |

(52) U.S. Cl.
 CPC ............ *B29B 13/10* (2013.01); *B29B 17/0026* (2013.01); *B29B 17/0412* (2013.01); *B29C 47/0011* (2013.01); *B29C 47/1027* (2013.01); *B29C 47/38* (2013.01); *B29B 2017/048* (2013.01); *B29C 47/1018* (2013.01); *B29K 2105/26* (2013.01); *Y02W 30/62* (2015.05); *Y02W 30/625* (2015.05)

(56) References Cited

U.S. PATENT DOCUMENTS

| | | | |
|---|---|---|---|
| 4,579,288 A | 4/1986 | McDermid et al. | |
| 5,102,326 A | 4/1992 | Bacher et al. | |
| 5,282,548 A | 2/1994 | Ishihara | |
| 5,651,944 A | 7/1997 | Schulz et al. | |
| 5,783,225 A | 7/1998 | Bacher et al. | |
| 5,882,558 A | 3/1999 | Bacher et al. | |
| 5,988,865 A | 11/1999 | Bacher et al. | |
| 6,619,575 B1 | 9/2003 | Bacher et al. | |
| 6,719,454 B1 * | 4/2004 | Bacher et al. | 366/314 |
| 6,784,214 B1 | 8/2004 | Bacher et al. | |
| 6,883,953 B1 * | 4/2005 | Bacher et al. | 366/76.1 |
| 7,275,703 B2 | 10/2007 | Bacher et al. | |
| 7,275,857 B2 | 10/2007 | Bacher et al. | |
| 7,291,001 B2 | 11/2007 | Bacher et al. | |
| 7,309,224 B2 * | 12/2007 | Bacher et al. | 425/202 |
| 7,842,221 B2 | 11/2010 | Magni et al. | |
| 8,399,599 B2 | 3/2013 | Hackl et al. | |
| 8,419,997 B2 | 4/2013 | Hackl et al. | |
| 8,616,478 B2 | 12/2013 | Weigerstorfer et al. | |
| 8,992,067 B2 | 3/2015 | Bacher et al. | |
| 2004/0232578 A1 | 11/2004 | Magni et al. | |
| 2006/0093696 A1 | 5/2006 | Bacher et al. | |
| 2006/0292259 A1 | 12/2006 | Bacher et al. | |
| 2007/0007375 A1 | 1/2007 | Bacher et al. | |
| 2007/0102550 A1 | 5/2007 | Lin | |
| 2010/0101454 A1 | 4/2010 | Wendelin et al. | |
| 2010/0140381 A1 | 6/2010 | Weigerstorfer et al. | |
| 2011/0049763 A1 | 3/2011 | Hackl et al. | |
| 2011/0251368 A1 | 10/2011 | Hackl et al. | |
| 2012/0091609 A1 | 4/2012 | Feichtinger et al. | |
| 2012/0200000 A1 * | 8/2012 | Klein et al. | 264/176.1 |
| 2013/0092768 A1 | 4/2013 | Feichtinger et al. | |
| 2013/0113139 A1 | 5/2013 | Weigerstorfer et al. | |
| 2013/0168201 A1 | 7/2013 | Hackl et al. | |
| 2014/0234462 A1 | 8/2014 | Feichtinger et al. | |
| 2014/0239104 A1 | 8/2014 | Feichtinger et al. | |
| 2014/0248388 A1 | 9/2014 | Feichtinger et al. | |
| 2014/0252147 A1 | 9/2014 | Feichtinger et al. | |
| 2014/0252148 A1 | 9/2014 | Feichtinger et al. | |
| 2014/0271968 A1 | 9/2014 | Feichtinger et al. | |
| 2014/0287081 A1 | 9/2014 | Feichtinger et al. | |
| 2014/0291427 A1 | 10/2014 | Feichtinger et al. | |
| 2014/0295016 A1 | 10/2014 | Feichtinger et al. | |
| 2014/0299700 A1 | 10/2014 | Feichtinger et al. | |
| 2014/0312151 A1 | 10/2014 | Feichtinger et al. | |

FOREIGN PATENT DOCUMENTS

| | | | |
|---|---|---|---|
| DE | 2839446 B1 | | 1/1980 |
| DE | 3525554 A1 | | 2/1986 |
| DE | 10140215 A1 | | 2/2003 |
| DE | 202009015256 U1 | | 4/2010 |
| EP | 0045734 A1 | | 2/1982 |
| EP | 0103754 A1 | | 3/1984 |
| EP | 0123771 A1 | | 11/1984 |
| EP | 0321742 A1 | | 6/1989 |
| EP | 0701505 A1 | | 3/1996 |
| EP | 0735945 A1 | | 10/1996 |
| EP | 0911131 A1 | | 4/1999 |
| EP | 1181141 A1 | | 2/2002 |
| EP | 1233855 A1 | | 8/2002 |
| EP | 0820375 A1 | | 1/2003 |
| EP | 1273412 A1 * | | 1/2003 |
| EP | 1401623 A1 | | 3/2004 |
| EP | 1628812 A1 | | 3/2006 |
| EP | 1628813 A1 | | 3/2006 |
| EP | 2012997 A1 | | 1/2009 |
| EP | 2196255 A1 | | 6/2010 |
| ES | 2214171 T1 | | 9/2004 |
| GB | 2030472 A1 | | 4/1980 |
| JP | A-7-148736 | | 6/1995 |
| JP | 2001-26019 A | | 1/2001 |
| JP | 2001-30244 A | | 2/2001 |
| SU | 536062 A1 | | 11/1976 |
| UA | 1427 U | | 10/2002 |
| WO | WO 97/18071 A1 | | 5/1997 |
| WO | WO 01/81058 A1 | | 11/2001 |
| WO | WO 02/36318 A1 | | 5/2002 |
| WO | 03/004236 A1 | | 1/2003 |
| WO | WO 2004/087391 A1 | | 10/2004 |
| WO | WO 2004/108379 A1 | | 12/2004 |
| WO | WO 2010/118447 A1 | | 10/2010 |
| WO | WO 2011051154 A1 * | | 5/2011 |

OTHER PUBLICATIONS

"Recyclinganlage Mit Grosser Flexibilitaet Und Verbesserter Effizienz: High-Flexibility Recycling System with Improved Efficiency," Plastverarbeiter, Huethig GmbH, Heidelberg, DE, vol. 43, No. 10, Oct. 1, 1992, pp. 36-38, XP000310013, ISSN: 0032-1338.
International Preliminary Report on patentability mailed Jan. 30, 2014, from PCT Application No. PCT/AT2012/050159 (14 pages).
Bacher H., "Recycling Von Thermplastischen Primaerabfaellen: Recycling Primary Thermoplastic Waste," Plasteverbarbeiter, Huethig GMBH, Heidelberg, DE, vol. 46, No. 2, Feb. 1, 1995, pp. 94, 97, & 98, XP000494391, ISSN: 0032-1338.
U.S. Appl. No. 14/351,869. Claims filed Mar. 11, 2015.
Kowalska B., "Genutete Einzugszonen Konstruktionsvarianten Fuer Einschneckenextruder: Grooved Feed Zones Design Variations for Single-Screw Extruders," Kunstoffe International, Carl Hanser Verlag, Munchen, DE, vol. 90, No. 2, Feb. 1, 2000, pp. 34-36, 38, XP000936826, ISSN: 0023-5563.
Bacher H., "Recycling Von Thermplastischen Primaerabfaellen: Recycling Primary Thermoplastic Waste, "Plasteverbarbeiter, Huethig GmbH, Heidelberg, DE, vol. 46, No. 2, Feb. 1, 1995, pp. 94, 97, & 98, XP000494391, ISSN: 0032-1338.
ASN 14351869. Claims filed Mar. 11, 2015.

* cited by examiner

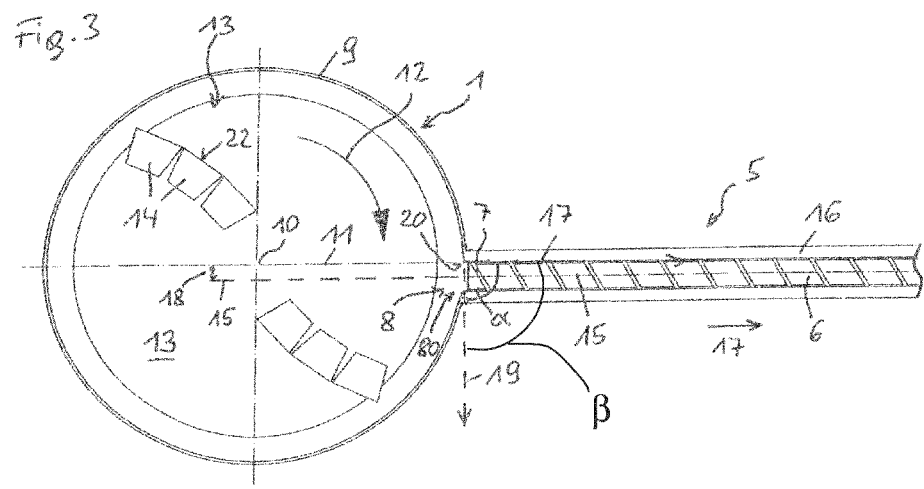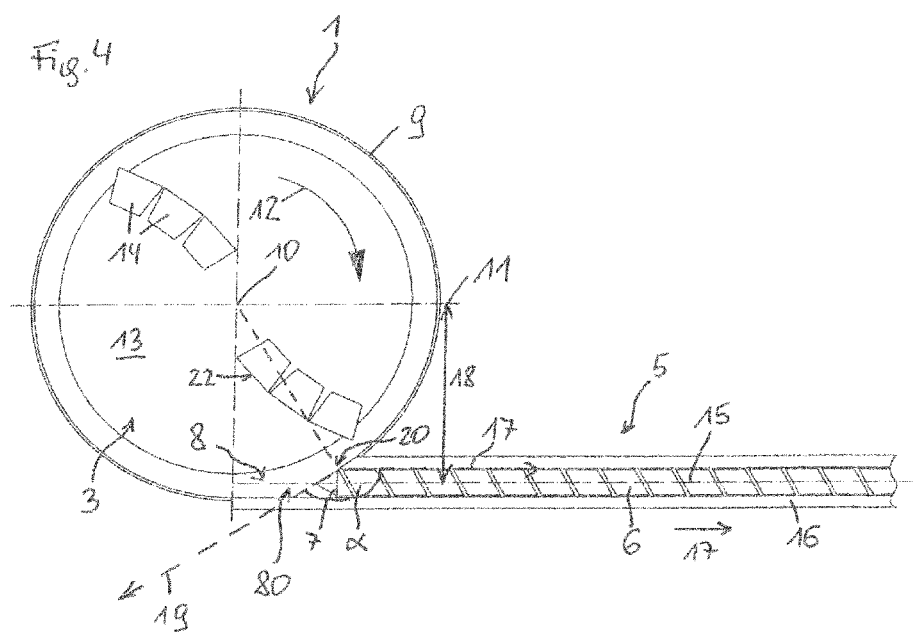

APPARATUS FOR PROCESSING PLASTIC MATERIAL

This application is a U.S. National Phase of International Application No. PCT/AT2012/050159, filed Oct. 12, 2012, which claims priority to Austrian Patent Application No. A 1503/2011, filed Oct. 14, 2011, the disclosures of which are incorporated by reference herein.

The invention relates to an apparatus according to the preamble of claim 1.

The prior art reveals numerous similar apparatuses of varying design, comprising a receiver or cutter compactor for the comminution, heating, softening and treatment of a plastics material to be recycled, and also, attached thereto, a conveyor or extruder for the melting of the material thus prepared. The aim here is to obtain a final product of the highest possible quality, mostly in the form of pellets.

By way of example, EP 123 771 or EP 303 929 describe apparatuses with a receiver and, attached thereto, an extruder, where the plastics material introduced into the receiver is comminuted through rotation of the comminution and mixing implements and is fluidized, and is simultaneously heated by the energy introduced. A mixture with sufficiently good thermal homogeneity is thus formed. This mixture is discharged after an appropriate residence time from the receiver into the screw-based extruder, and is conveyed and, during this process, plastified or melted. The arrangement here has the screw-based extruder approximately at the level of the comminution implements. The softened plastics particles are thus actively forced or stuffed into the extruder by the mixing implements.

Most of these designs, which have been known for a long time, however, are unsatisfactory in respect of the quality of the treated plastics material obtained at the outgoing end of the screw, and/or in respect of the quantitative output or throughput of the screw.

Critical to the end quality of the product are, firstly, the quality of the pretreated or softened polymer material that enters the conveyor or extruder from the cutter compactor, and, additionally, the situation at intake and on conveying or, where appropriate, extrusion. Relevant factors here include the length of the individual regions or zones of the screw, and also the screw parameters, such as, for example, screw thickness, flight depths, and so on.

In the case of the present cutter compactor/conveyor combinations, accordingly, there are particular circumstances, since the material which enters the conveyor is not introduced directly, without treatment and cold, but instead has already been pretreated in the cutter compactor, viz. heated, softened and/or partly crystallized, etc. This is a co-determining factor for the intake and for the quality of the material.

The two systems—that is, the cutter compactor and the conveyor—exert an influence on one another, and the outcomes of the intake and of the further conveying, and compaction, where appropriate, are heavily dependent on the pretreatment and the consistency of the material.

One important region, accordingly, is the interface between the cutter compactor and the conveyor, in other words the region in which the homogenized pretreated material is passed from the cutter compactor into the conveyor or extruder. On the one hand, this is a purely mechanical problem area, requiring the coupling to one another of two differently operating devices. Moreover, this interface is tricky for the polymer material as well, since at this point the material is usually, close to the melting range, in a highly softened state, but is not allowed to melt. If the temperature is too low, then there are falls in the throughput and the quality; if the temperature is too high, and if unwanted melting occurs at certain places, then the intake becomes blocked.

Furthermore, precise metering and feeding of the conveyor is difficult, since the system is a closed system and there is no direct access to the intake; instead, the feeding of the material takes place from the cutter compactor, and therefore cannot be influenced directly, via a gravimetric metering device, for example.

It is therefore critical to design this transition not only in a mechanically considered way, in other words with an understanding of the polymer properties, but at the same time to consider the economics of the overall operation—in other words, high throughput and appropriate quality. The preconditions to be observed here are in some cases mutually contradictory.

A feature shared by the apparatuses known from the prior art and mentioned in the introduction is that the direction of conveying or of rotation of the mixing and comminution implements, and therefore the direction in which the particles of material circulate in the receiver, and the direction of conveying of the extruder, are in essence identical or have the same sense. This arrangement, selected intentionally, was the result of the desire to maximize stuffing of the material into the screw, or to force-feed the screw. This concept of stuffing the particles into the conveying screw or extruder screw in the direction of conveying of the screw was also very obvious and was in line with the familiar thinking of the person skilled in the art, since it means that the particles do not have to reverse their direction of movement and there is therefore no need to exert any additional force for the change of direction. An objective here, and in further derivative developments, was always to maximize screw fill and to amplify this stuffing effect. By way of example, attempts have also been made to extend the intake region of the extruder in the manner of a cone or to curve the comminution implements in the shape of a sickle, so that these can act like a trowel in feeding the softened material into the screw. Displacement of the extruder, on the inflow side, from a radial position to a tangential position in relation to the container further amplified the stuffing effect, and increased the force with which the plastics material from the circulating implement was conveyed or forced into the extruder.

Apparatuses of this type are in principle capable of functioning, and they operate satisfactorily, although with recurring problems:

By way of example, an effect repeatedly observed with materials with low energy content, e.g. polyethylene terephthalate (PET) fibres or PET foils, or with materials which at a low temperature become sticky or soft, e.g. polylactic acid (PLA), is that when, intentionally, stuffing of the plastics material into the intake region of the extruder, under pressure, is achieved by components moving in the same sense, this leads to premature melting of the material immediately after, or else in, the intake region of the extruder. This firstly reduces the conveying effect of the extruder, and secondly there can also be some reverse flow of the said melt into the region of the cutter compactor or receiver, with the result that flakes that have not yet melted adhere to the melt, and in turn the melt thus cools and to some extent solidifies, with resultant formation of a clump or conglomerate made of to some extent solidified melt and of solid plastics particles. This causes blockage on the intake of the extruder and caking of the mixing and comminution implements. A further consequence is reduction of the throughput of the extruder, since adequate filling of the screw is no longer achieved. Another possibility here is that movement of the mixing and comminution implements is prevented. In such cases, the system normally has to be shut down and thoroughly cleaned.

Problems also occur with polymer materials which have already been heated in the cutter compactor up to the vicinity of their melting range. If overfilling of the intake region occurs here, the material melts and intake is impaired.

Problems are also encountered with fibrous materials that are mostly orientated and linear, with a certain amount of longitudinal elongation and low thickness or stiffness, for example plastics foils cut into strips. A main reason for this is that the elongate material is retained at the outflow end of the intake aperture of the screw, where one end of the strip protrudes into the receiver and the other end protrudes into the intake region. Since the mixing implements and the screw are moving in the same sense or exert the same conveying-direction component and pressure component on the material, both ends of the strip are subjected to tension and pressure in the same direction, and release of the strip becomes impossible. This in turn leads to accumulation of the material in the said region, to a narrowing of the cross section of the intake aperture, and to poorer intake performance and, as a further consequence, to reduced throughput. The increased feed pressure in this region can moreover cause melting, and this in turn causes the problems mentioned in the introduction.

Co-rotating cutter compactors of this kind have had a variety of extruders or conveyors attached to them, the results having in principle been entirely acceptable and attractive. The applicant, however, has performed comprehensive investigations for making still further improvements to the system as a whole.

It is therefore an object of the present invention to overcome the disadvantages mentioned and to improve an apparatus of the type described in the introduction in such a way as to permit problem-free intake of conventional materials by the screw, and also of those materials that are sensitive or strip-shaped, and to permit processing or treatment of these materials to give material of high quality, with high and constant throughput, while saving energy.

The characterizing features of claim 1 achieve this object in an apparatus of the type mentioned in the introduction.

A first provision here is that the imaginary continuation of the central longitudinal axis of the conveyor, in particular extruder, if this has only a single screw, or the longitudinal axis of the screw closest to the intake aperture, if the conveyor has more than one screw, in the direction opposite to the direction of conveying of the conveyor, passes, and does not intersect, the axis of rotation, where, on the outflow side in the direction of rotation of the implements, there is an offset distance between the longitudinal axis of the conveyor, if this has a single screw, or the longitudinal axis of the screw closest to the intake aperture, and the radius that is associated with the container and that is parallel to the longitudinal axis and that proceeds outwards from the axis of rotation of the mixing and/or comminution implement in the direction of conveying of the conveyor.

The direction of conveying of the mixing implements and the direction of conveying of the conveyor are therefore no longer in the same sense, as is known from the prior art, but instead are at least to a small extent in the opposite sense, and the stuffing effect mentioned in the introduction is thus reduced. The intentional reversal of the direction of rotation of the mixing and comminution implements in comparison with apparatuses known hitherto reduces the feed pressure on the intake region, and the risk of overfilling decreases. In this way, excess material is not stuffed or trowelled with excessive pressure into the intake region of the conveyor, but instead, in contrast, there is in fact in turn a tendency to remove excess material from that region, in such a way that although there is always sufficient material present in the intake region, the additional pressure exerted is small or almost zero. This method can provide adequate filling of the screw and constant intake of sufficient material by the screw, without any overfilling of the screw with, as a further consequence, local pressure peaks where the material could melt.

Melting of the material in the region of the intake is thus prevented, and operating efficiency is therefore increased, maintenance intervals are therefore lengthened, and downtime due to possible repairs and cleaning measures is shortened.

By virtue of the reduced feed pressure, displaceable elements which can be used in a known manner to regulate the degree of filling of the screw react markedly more sensitively, and the degree of filling of the screw can be adjusted with even greater precision. This makes it easier to find the ideal point at which to operate the system, in particular for relatively heavy materials, for example regrind made of high-density polyethylene (HDPE) or PET.

Surprisingly and advantageously it has moreover been found that operation in the opposite sense, according to the invention, improves intake of materials which have already been softened almost to the point of melting. In particular when the material is already in a doughy or softened condition, the screw cuts the material from the doughy ring adjacent to the container wall. In the case of a direction of rotation in the direction of conveying of the screw, this ring would instead be pushed onward, and removal of an outer layer by the screw would not be possible, with resultant impairment of intake. The reversal of the direction of rotation, according to the invention, avoids this.

Furthermore, the retention or accumulation phenomena formed in the case of the treatment of the materials which have been described above and are in strip form or fibrous can be resolved more easily, or do not occur at all, since, at the aperture edge situated in the direction of rotation of the mixing implements on the outflow side or downstream, the direction vector for the mixing implements and the direction vector for the conveyor point in almost opposite directions, or in directions that at least to a small extent have opposite sense, and an elongate strip cannot therefore become curved around, and retained by, the said edge, but instead becomes entrained again by the mixing vortex in the receiver.

The overall effect of the design according to the invention is that intake performance is improved and throughput is markedly increased. The stability and performance of the entire system made of cutter compactor and conveyor is thus increased.

The applicant has further found that by configuring the mixing and comminution implements in a particular way it is possible to achieve surprising advantageous effects which have a direct influence on the intake performance of the conveyor or extruder.

Accordingly, provision is also made, in accordance with the invention, for the setting angle $\gamma$ of the frontal edge of the radially outermost mixing and/or comminution implement, closest to the base, or of the radially outermost implement and/or blade to comply with the relationship $\gamma = k*d + K$, where d is the average diameter of the screw in mm in the region of the intake aperture, K is a factor or a constant in the range from 15 to 35, k is a factor in the range from 0.08 to 0.2.

The setting angle $\gamma$ here is measured at the radially outermost point of the mixing and/or comminution implement, closest to the base, of the implement and/or blade, that is, the angle between the continuation of the, in particular straight, frontal edge and the radius of the container running through this outermost point. In this connection, the L/D ratio is in any case greater than or equal to 7, preferably greater than or equal to 10 or even greater, preferably greater than 15. The diameter of the screw is the average diameter in the region downstream of the intake aperture.

The implements circulating in the container have an effect on the material, not only stuffing it into the screw, but also mixing it, driving the material around in the container and thoroughly mixing it. If blades are present, these also have a cutting or comminuting effect.

This means that the setting angle in relation to the radius is smaller, the smaller the screw is. The smaller the setting angle is, the more the material that is to be treated is driven around in the cutter compactor and the less it is stuffed into the screw. The larger the setting angle is, the more the implements or blades have a stuffing effect and as a result the material remains for a shorter time in the cutter compactor, and the particles are cut less frequently.

The smaller the screw is, the smaller the particles must also be, with the already compacted and softened particles behaving in a manner similar to fluid in the region of the intake. This means that the material must be driven around more, as a result of which the implements act upon the material, or the blades cut it, to a greater extent, and accordingly the particles become smaller. The implements of systems with smaller screws therefore have more demands and must accordingly be provided with a smaller setting angle.

The larger the screw is, the more the implement can stuff or act like a trowel, that is, the greater the setting angle can be, since a larger screw tolerates larger particles or can take in and process larger particles.

As a result of the relationship specified, an optimum has been found between cutting and stuffing for this special system.

In this connection, it has surprisingly been discovered that, due to the gentle stuffing behaviour effected because of the opposite direction of rotation of the mixing implements, implements can be used in the cutter compactor that are more aggressive and that introduce more energy into the material. Accordingly, the cutter compactor can be operated at a relatively high temperature, a consequence of which in turn is better homogeneity with a reduced residence time. According to the invention, particularly good and effective introduction of energy is achieved by the particular setting angles of the implements in combination with their, the implements', reverse direction of rotation.

Another unexpected consequence of such a combination of a cutter compactor with implements set up in such a way and corresponding direction of rotation and an attached extruder is improved melting performance of the material in the extruder since particles which are already well preheated pass into the screw. This provides compensation for possible inhomogeneity, and the material that passes from the container into the screw housing and is then compressed and melted has high thermal and mechanical homogeneity. The final quality of the plastified or agglomerated material at the end of the extruder screw or of the agglomerating screw is correspondingly also very high, and it is possible to use screws which—because of the pretreatment and the intake—treat the polymer in a non-aggressive manner and introduce a particularly small amount of shear into the material in order to melt the same.

Moreover, the constancy of throughput over time is higher, and/or the throughput performances are more uniform, and the intake operates reliably without problems associated with the filling of the screw.

Further advantageous embodiments of the invention are described via the following features:

A setting angle that is advantageous in practice lies in the range from 20° to 60°, in particular 30° to 50°.

According to one preferred further development it is advantageous if the setting angle γ additionally also complies with the relationship $\gamma = k1 * D_B + K1$, where $D_B$ is the internal diameter in mm of the cylindrical cutter compactor or container with circular cross section or the internal diameter in mm of an imaginary cylindrical container with circular cross section which is of the same height and is calculated to have the same volume capacity, K1 is a factor or a constant in the range from 12 to 40, k1 is a factor in the range from 0.005 to 0.015.

In cutting systems, that is, containers with blades, there is the tendency for the setting angle of the outermost implements to be dependent upon the diameter of the cutter compactor. The greater the diameter of the container is, the greater the setting angle relative to the radius is and the greater the distance of the implement to the wall of the cutter compactor must be. The implement then has more of a stuffing effect than a circulating effect. If the distance to the container wall becomes very small, the particles between the container wall and the implement are pinched and the disc can block.

In this connection, it has proved advantageous in experiments if the setting angle for containers with diameters smaller than 750 mm lies in the range from 20° to 35°, for containers with diameters of 750 mm to 1300 mm it lies in the range from 28° to 47°, and for containers with diameters greater than 1300 mm it lies in the range from 35° to 55°.

It is precisely in this connection that it is particularly advantageous if the radial distance of the implement mb, measured from the radially outermost point of the mixing and/or comminution implement, closest to the base, or implements and/or blades provided there, or from the described circle defined by this point, as far as the inner surface of the side wall of the container, complies with the relationship $mb = k3 * D_B$, where $D_B$ is the internal diameter in mm of a cylindrical container with circular cross section or the internal diameter in mm of an imaginary cylindrical container with circular cross section which is of the same height and is calculated to have the same volume capacity, and k3 is a constant in the range from 0.006 to 0.16.

Advantageously, the radial distance of the implement mb lies in the range from 15 mm to 120 mm, preferably in the range from 20 mm to 80 mm.

The smaller the setting angle is, the closer the implements can come to the container wall. The larger the setting angle is, the more the cut of the blades has a drawing or drawing in action and the further the implements must be spaced away from the container wall in order to prevent blockage and braking caused thereby as a result or particles caught therein.

In this connection, it has been discovered by way of tests that with a setting angle in the range from 20° to 33°, the minimum radial distance of the implement mb advantageously lies in the range from 15 mm to 20 mm. With a setting angle in the range from 45° to 60° the minimum radial distance of the implement mb is advantageously greater than or equal to 35 mm.

The applicant has further found that by interposing a particular distance between the mixing and comminution implements and the screw it is possible to achieve advantageous effects which have a direct influence on the intake behaviour of the conveyor or extruder. In accordance with a further advantageous development, provision is made for the smallest possible distance ms between the implement and the screw to be described by the relationship ms≤k*d+K, where d is the average diameter of the screw in mm in the region of the intake aperture, K2 is a factor or a constant in the range from 20 to 100, more particularly 20 to 80, k2 is a factor in the range from 0.03 to 0.4, more particularly 0.04 to 0.25.

The distance ms preferably lies in the range from 15 mm to 150 mm. The distance ms is then measured from the radially outermost point of the lowermost mixing and/or comminution implement, closest to the base, or implements and/or blades that protrude away and are provided there, up to a point located on the envelope of the screw closest to the intake aperture. The distance ms here runs along a radius which extends from the axis of rotation of the container and passes through the aperture and the intake aperture up to the screw. The distance ms is the smallest possible distance which can be occupied by the tip of the implement relative to the screw when the tip of the implement rotates along past the screw. In the case of a tangential disposition of the screw to the container, in operation, the outermost implement tip moves past the aperture or intake aperture. In this case the distance changes continuously, and there is a minimum distance ms.

In accordance with a further embodiment, provision is made for at least one, preferably a plurality of, further implements or blades to be provided situated further inwards radially. The setting angle of each implement or blade, measured, like the setting angle γ, at their respective radially outermost points, between the continuation of their, in particularly straight, frontal edges and the radius running through this point, is in each case smaller than the setting angle of the immediately adjacent implement or blade situated further outwards. The further implements or blades are preferably situated on the same horizontal plane or are arranged on the same carrier disc. Since in the region of the container located further inwards the angular velocity of the implements is lower, the implements must be oriented more radially, in a range from 0° to 30°, preferably 5° to 25°, in order to accelerate the material in a corresponding manner in the circumferential direction.

According to an advantageous development of the invention, the conveyor is arranged on the receiver in such a way that the scalar product of the direction vector (direction vector that is associated with the direction of rotation) that is tangential to the circle described by the radially outermost point of the mixing and/or comminution implement or to the plastics material transported past the aperture and that is normal to a radius of the receiver and that points in the direction of rotation or of movement of the mixing and/or comminution implement and of the direction vector that is associated with the direction of conveying of the conveyor at each individual point or in the entire region of the aperture or at each individual point or in the entire region immediately radially in front of the aperture is zero or negative. The region immediately radially in front of the aperture is defined as that region which is in front of the aperture and at which the material is just about to pass through the aperture but has not yet passed the aperture. The advantages mentioned in the introduction are thus achieved, and there is effective avoidance of all types of agglomeration in the region of the intake aperture, brought about by stuffing effects. In particular here, there is also no dependency on the spatial arrangement of the mixing implements and of the screw in relation to one another, and by way of example the orientation of the axis of rotation does not have to be normal to the basal surface or to the longitudinal axis of the conveyor or of the screw. The direction vector that is associated with the direction of rotation and the direction vector that is associated with the direction of conveying lie within a, preferably horizontal, plane, or in a plane orientated so as to be normal to the axis of rotation.

In another advantageous formation, the angle included between the direction vector that is associated with the direction of rotation of the mixing and/or comminution implement and the direction vector that is associated with the direction of conveying of the conveyor is greater than or equal to 90° and smaller than or equal to 180°, where the angle is measured at the point of intersection of the two direction vectors at the edge that is associated with the aperture and that is situated upstream of the direction of rotation or of movement, in particular at the point that is on the said edge or on the aperture and is situated furthest upstream. This therefore describes the range of angles within which the conveyor must be arranged on the receiver in order to achieve the advantageous effects. In the entire region of the aperture or at each individual point of the aperture, the forces acting on the material are therefore orientated at least to a small extent in an opposite sense, or in the extreme case the orientation is perpendicular and pressure-neutral. At no point of the aperture is the scalar product of the direction vectors of the mixing implements and of the screw positive, and no excessive stuffing effect occurs even in a subregion of the aperture.

Another advantageous formation of the invention provides that the angle included between the direction vector that is associated with the direction of rotation or of movement and the direction vector that is associated with the direction of conveying is from 170° to 180°, measured at the point of intersection of the two direction vectors in the middle of the aperture. This type of arrangement is relevant by way of example when the conveyor is arranged tangentially on the cutter compactor.

In order to ensure that no excessive stuffing effect occurs, the distance, or the offset, between the longitudinal axis and the radius can advantageously be greater than or equal to half of the internal diameter of the housing of the conveyor or of the screw.

It can moreover be advantageous for these purposes to set the distance or offset between the longitudinal axis and the radius to be greater than or equal to 7%, or still more advantageously greater than or equal to 20%, of the radius of the receiver. In the case of conveyors with a prolonged intake region or with a grooved bushing or extended hopper, it can be advantageous for this distance or offset to be greater than or equal to the radius of the receiver. This is particularly true for cases where the conveyor is attached tangentially to the receiver or runs tangentially to the cross section of the container.

It is particularly advantageous if the longitudinal axis of the conveyor or of the screw or the longitudinal axis of the screw closest to the intake aperture runs tangentially with respect to the inner side of the side wall of the container, or the inner wall of the housing does so, or the envelope of the screw does so, it being preferable that there is a drive connected to the end of the screw, and that the screw provides conveying, at its opposite end, to a discharge aperture, in particular an extruder head, arranged at the end of the housing.

In the case of conveyors that are radially offset, but not arranged tangentially, it is advantageous to provide that the imaginary continuation of the longitudinal axis of the conveyor in a direction opposite to the direction of conveying, at least in sections, passes, in the form of a secant, through the space within the receiver.

It is advantageous to provide that there is immediate and direct connection between the aperture and the intake aperture, without substantial separation or a transfer section, e.g. a conveying screw. This permits effective and non-aggressive transfer of material.

The reversal of the direction of rotation of the mixing and comminution implements circulating in the container can certainly not result from arbitrary action or negligence, and it is not possible—either in the known apparatuses or in the apparatus according to the invention—simply to allow the mixing implements to rotate in the opposite direction, in particular because the arrangement of the mixing and comminution implements is in a certain way asymmetrical or direction-oriented, and their action is therefore only single-sided or unidirectional. If this type of equipment were to be rotated intentionally in the wrong direction, a good mixing vortex would not form, and there would be no adequate comminution or heating of the material. Each cutter compactor therefore has its unalterably prescribed direction of rotation of the mixing and comminution implements.

In this connection, it is particularly advantageous to provide that the manner of formation, curvature, set-up and/or arrangement of the frontal regions or frontal edges that are associated with the mixing and/or comminution implements, act on the plastics material and point in the direction of rotation or of movement differs when comparison is made with the regions that, in the direction of rotation or of movement, are at the rear or behind.

The implements and/or blades can either have been fastened directly on the shaft or preferably are arranged on a rotatable implement carrier or, respectively, a carrier disc arranged in particular parallel to the basal surface, or are formed therein or moulded onto the same, optionally as a single piece.

In principle, the effects mentioned are relevant not only to compressing extruders or agglomerators but also to conveying screws that have no, or less, compressing effect. Here again, local overfeed is avoided.

In another particularly advantageous formation, it is provided that the receiver is in essence cylindrical with a level basal surface and with, orientated vertically in relation thereto, a side wall which has the shape of the jacket of a cylinder. In another simple design, the axis of rotation coincides with the central axis of the receiver. In another advantageous formation, the axis of rotation or the central axis of the container are orientated vertically and/or normally in relation to the basal surface. These particular geometries optimize intake performance, with an apparatus design that provides stability and simple construction.

In this connection it is also advantageous to provide that the mixing and/or comminution implement or, if a plurality of mutually superposed mixing and/or comminution implements have been provided, the lowest mixing and/or comminution implement closest to the base is arranged at a small distance from the basal surface, in particular in the region of the lowest quarter of the height of the receiver, and also that the aperture is similarly arranged. The distance here is defined and measured from the lowest edge of the aperture or of the intake aperture to the container base in the edge region of the container. There is mostly some rounding of the edge at the corner, and the distance is therefore measured from the lowest edge of the aperture along the imaginary continuations of the side wall downwards to the imaginary outward continuation of the container base. Distances with good suitability are from 10 to 400 mm.

The container does not necessarily have to have a cylindrical shape with circular cross section, even though this shape is advantageous for practical reasons and reasons of manufacturing technology. When container shapes deviate from the cylindrical shape with circular cross section, examples being containers having the shape of a truncated cone or cylindrical containers which, in plan view, are elliptical or oval, a calculation is required for conversion to a cylindrical container which has circular cross section and the same volume capacity, on the assumption that the height of this imaginary container is the same as its diameter. Container heights here which are substantially higher than the resultant mixing vortex (after taking into account the distance required for safety) are ignored, since this excess container height is not utilized and it therefore has no further effect on the processing of the material.

The expression conveyor in the present case means systems with screws that have non-compressing or decompressing effect, i.e. screws which have purely conveying effect, but also systems with screws that have compressing effect, i.e. extruder screws with agglomerating or plastifying effect.

The expressions extruder and extruder screw in the present text mean extruders or screws used for complete or partial melting of the material, and also extruders used to agglomerate, but not melt, the softened material. Screws with agglomerating effect subject the material to severe compression and shear only for a short time, but do not plastify the material. The outgoing end of the agglomerating screw therefore delivers material which has not been completely melted but which instead is composed of particles incipiently melted only at their surface, which have been caked together as if by sintering. However, in both cases the screw exerts pressure on the material and compacts it.

All of the examples described in the figures below depict conveyors with a single screw, for example single-screw extruders. However, it is also possible as an alternative to provide conveyors with more than one screw, for example twin- or multiscrew conveyors or twin- or multiscrew extruders, in particular with a plurality of identical screws, which at least have the same diameters d.

Further features and advantages of the invention are apparent from the description of the inventive examples below of the subject matter of the invention, which are not to be interpreted as restricting, and which the drawings depict diagrammatically and not to scale:

FIG. 3 shows another embodiment with minimal offset.

FIG. 4 shows another embodiment with relatively large offset.

Figure 1:
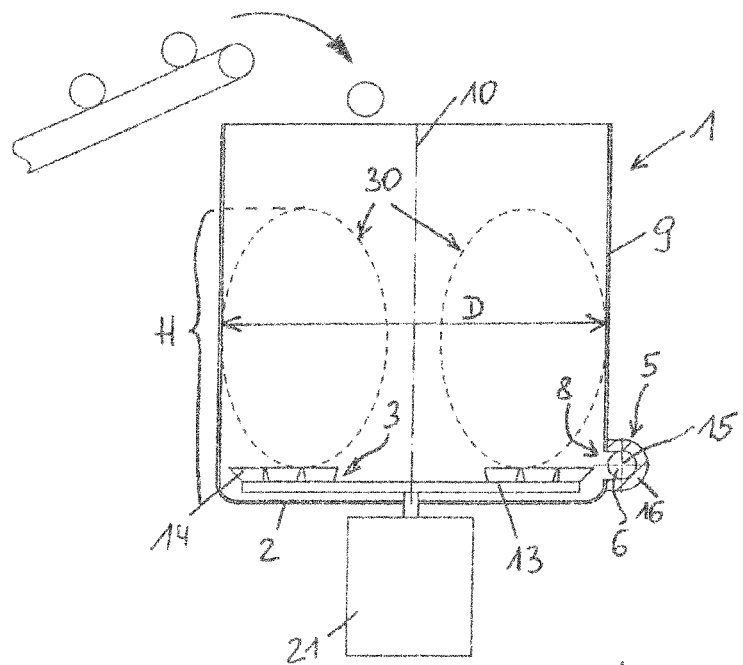
FIG. 1 shows a vertical section through an apparatus according to the invention with extruder attached approximately tangentially.

Neither the containers, nor the screws nor the mixing implements are to scale, either themselves or in relation to one another, in the drawings. By way of example, therefore, the containers are in reality mostly larger, or the screws longer, than depicted here.

Figure 2:
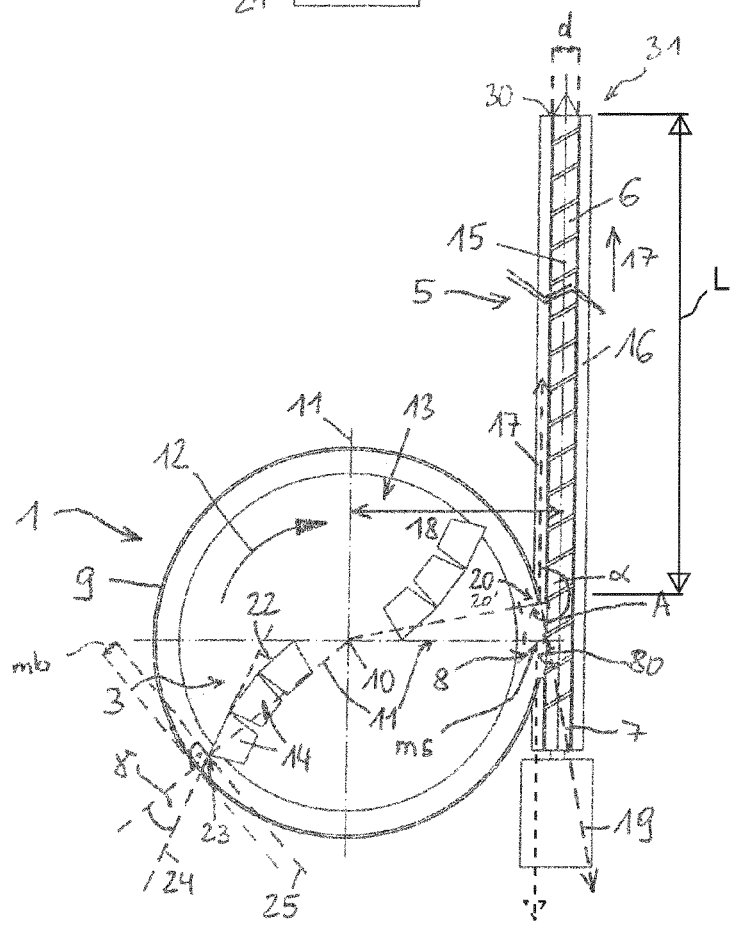
FIG. 2 shows a horizontal section through the embodiment of FIG. 1.

The advantageous cutter compactor-extruder combination depicted in FIG. 1 and FIG. 2 for the treatment or recycling of plastics material has a cylindrical container or cutter compactor or shredder 1 with circular cross section, with a level, horizontal basal surface 2 and with a vertical side wall 9 oriented normally thereto with the shape of a cylinder jacket.

Arranged at a small distance from the basal surface 2, at most at about 10 to 20%, or optionally less, of the height of the side wall 9—measured from the basal surface 2 to the uppermost edge of the side wall 9—is an implement carrier 13 or a level carrier disc orientated parallel to the basal surface 2, which carrier or disc can be rotated, in the direction 12 of rotation or of movement indicated by an arrow 12, around a central axis 10 of rotation, which is simultaneously the central axis of the container 1. A motor 21, located below the container 1, drives the carrier disc 13. On the upper side of the carrier disc 13, blades or implements, e.g. cutter blades, 14 are arranged, and together with the carrier disc 13 form the mixing and/or comminution implement 3.

As indicated in the diagram, the blades 14 are not arranged symmetrically on the carrier disc 13, but instead have a particular manner of formation, set-up or arrangement on their frontal edges 22 facing in the direction 12 of rotation or of movement, so that they can have a specific mechanical effect on the plastics material. The radially outermost edges of the mixing and comminution implements 3 reach a point which is relatively close to, about 5% of the radius 11 of the container 1 from, the inner surface of the side wall 9.

The container 1 has, near the top, a charging aperture through which the product to be processed, e.g. portions of plastics foils, is charged by way of example by means of a conveying device in the direction of the arrow. The container 1 can, as an alternative, be a closed container and capable of evacuation at least as far as an industrial vacuum, the material being introduced by way of a system of valves. The said product is received by the circulating mixing and/or comminution implements 3 and is raised to form a mixing vortex 30, where the product rises along the vertical side wall 9 and, approximately in the region of the effective container height H, falls back again inward and downward into the region of the centre of the container, under gravity. The effective height H of the container 1 is approximately the same as its internal diameter D. In the container 1, a mixing vortex is thus formed, in which the material is circulated in a vortex both from top to bottom and also in the direction 12 of rotation. By virtue of this particular arrangement of the mixing and comminution elements 3 or the blades 14, this type of apparatus can therefore be operated only with the prescribed direction 12 of rotation or movement, and the direction 12 of rotation cannot be reversed readily or without additional changes.

The circulating mixing and comminution implements 3 comminute and mix the plastics material introduced, and thereby heat and soften it by way of the mechanical frictional energy introduced, but do not melt it. After a certain residence time in the container 1, the homogenized, softened, doughy but not molten material is, as described in detail below, removed from the container 1 through an aperture 8, passed into the intake region of an extruder 5, and received by a screw 6 there and subsequently melted.

At the level of the, in the present case single, comminution and mixing implement 3, the said aperture 8 is formed in the side wall 9 of the container 1, and the pretreated plastics material can be removed from the interior of the container 1 through this aperture. The material is passed to a single-screw extruder 5 arranged tangentially on the container 1, where the housing 16 of the extruder 5 has, situated in its jacket wall, an intake aperture 80 for the material to be received by the screw 6. This type of embodiment has the advantage that the screw 6 can be driven from the lower end in the drawing by a drive, depicted only diagrammatically, in such a way that the upper end of the screw 6 in the drawing can be kept free from the drive. The discharge aperture for the plastified or agglomerated plastics material conveyed by the screw 6 can therefore be arranged at the said right-hand end, e.g. in the form of an extruder head not depicted. The plastics material can therefore be conveyed without deflection by the screw 6 through the discharge aperture; this is not readily possible in the embodiments according to FIGS. 3 and 4.

There is connection for conveying of material or for transfer of material between the intake aperture 80 and the aperture 8, and in the present case this connection to the aperture 8 is direct and immediate and involves no prolonged intervening section and no separation. All that is provided is a very short transfer region.

In the housing 16, there is a screw 6 with compressing effect, mounted rotatably around its longitudinal axis 15. The longitudinal axis 15 of the screw 6 and that of the extruder 5 coincide. The extruder 5 conveys the material in the direction of the arrow 17. The extruder 5 is a conventional extruder known per se in which the softened plastics material is compressed and thus melted, and the melt is then discharged at the opposite end, at the extruder head.

The mixing and/or comminution implements 3 or the blades 14 are at approximately the same level as the central longitudinal axis 15 of the extruder 5. The outermost ends of the blades 14 have adequate separation from the flights of the screw 6.

In the embodiment according to FIGS. 1 and 2, the extruder 5 is, as mentioned, attached tangentially to the container 1, or runs tangentially in relation to its cross section. In the drawing, the imaginary continuation of the central longitudinal axis 15 of the extruder 5 or of the screw 6 in a direction opposite to the direction 17 of conveying of the extruder 5 towards the rear passes the axis 10 of rotation and does not intersect the same. On the outflow side, there is an offset distance 18 between the longitudinal axis 15 of the extruder 5 or of the screw 6 and that radius 11 of the container 1 that is parallel to the longitudinal axis 15 and proceeds outwards from the axis 10 of rotation of the mixing and/or comminution implement 3 in the direction 17 of conveying of the extruder 5. In the present case, the imaginary continuation of the longitudinal axis 15 of the extruder 5 towards the rear does not pass through the space within the container 1, but instead passes it at a short distance.

The distance 18 is somewhat greater than the radius of the container 1. There is therefore a slight outward offset of the extruder 5, or the intake region is somewhat deeper.

The expressions "opposite", "counter-" and "in an opposite sense" here mean any orientation of the vectors with respect to one another which is not acute-angled, as explained in detail below.

In other words, the scalar product of a direction vector 19 which is associated with the direction 12 of rotation and the orientation of which is tangential to the circle described by the outermost point of the mixing and/or comminution implement 3 or tangential to the plastics material passing the aperture 8, and which points in the direction 12 of rotation or movement of the mixing and/or comminution implements 3, and of a direction vector 17 which is associated with the direction of conveying of the extruder 5 and which proceeds in the direction of conveying parallel to the central longitudinal axis 15 is everywhere zero or negative, at each individual point of the aperture 8 or in the region radially immediately in front of the aperture 8, and is nowhere positive.

In the case of the intake aperture in FIGS. 1 and 2, the scalar product of the direction vector 19 for the direction 12 of rotation and of the direction vector 17 for the direction of conveying is negative at every point of the aperture 8.

The angle α between the direction vector 17 for the direction of conveying and the direction vector for the direction 19 of rotation, measured at the point 20 that is associated with the aperture 8 and situated furthest upstream of the direction 12 of rotation, or at the edge associated with the aperture 8 and situated furthest upstream, is approximately maximally about 170°.

As one continues to proceed downwards along the aperture 8 in FIG. 2, i.e. in the direction 12 of rotation, the obtuse angle between the two direction vectors continues to increase. In the centre of the aperture 8, the angle between the direction vectors is about 180° and the scalar product is maximally negative, and further downwards from there the angle indeed becomes >180° and the scalar product in turn decreases, but still remains negative. However, these angles are no longer termed angles α, since they are not measured at point 20.

An angle β, not included in the drawing in FIG. 2, but shown in FIG. 3, measured in the centre of the aperture 8, between the direction vector for the direction 19 of rotation and the direction vector for the direction 17 of conveying is about 178° to 180°.

The apparatus according to FIG. 2 represents the first limiting case or extreme value. This type of arrangement can provide a very non-aggressive stuffing effect or a particularly advantageous feed, and this type of apparatus is particularly advantageous for sensitive materials which are treated in the vicinity of the melting range, or for product in the form of long strips.

The setting angle γ is drawn in in FIG. 2 and is measured at the radially outermost point 23 of the mixing and/or comminution implement 3, closest to the base, or the implement or blade 14. The setting angle γ lies between the continuation 24 of the frontal edge 22, which is formed as a cutting edge and is straight in FIG. 2, of the outermost blade and the radius 11 of the container 1 running through the point 23. The setting angle γ is approximately 25° in FIG. 2.

Provided in the apparatus according to FIG. 2 there are two further blades 14 lying further inwards radially and arranged on the same carrier disc 13 next to one another. The setting angle of these blades 14 is measured analogously to the setting angle γ, that is, at their respective radially outermost points, between the continuation of their straight frontal edges 22 and the radius 11 running through this point. The setting angle of the frontal edge 22 of the central blade 14 amounts to approximately 23°, the setting angle of the radially innermost blade 14 amounts to approximately 22°. FIG. 2, however, is not true to scale. The smaller setting angles make allowance for the lower angular velocity.

The L/D ratio, that is, the ratio of the length L of the screw 6, measured from the edge 20' situated downstream in the direction of conveying of the screw 6, or the point 20 of the intake aperture 80, situated furthest downstream, to the end of the screw 6 or to the first discharge aperture 30 in the housing 16 for the melt situated furthest upstream in relation to the direction of conveying of the screw 6 at the distal end 31 of the screw 6 remote from the container, to the nominal diameter d of the screw (6) in FIG. 2 is over 15.

The radial distance of the implement mb, measured from the radially outermost point 23 or from the tip of the blade 14 that is situated the furthest outwards, or from the circle defined thereby, up to the inner surface of the side wall 9 of the container 1 is drawn in by way of example in FIG. 2. This complies with the relationship mb=k*$D_B$. The implements or blades 14 protrude above the carrier disc 13 or in front of it.

The smallest possible distance ms between the implement and screw, measured from the radially outermost point 23 or from the tip of the blade 14 that is situated the furthest outwards, or from the circle defined thereby, up to the envelope of the screw 6, is likewise drawn in by way of example in FIG. 2. The distance ms is situated in essence centrally to the length of the inlet aperture 80 and on the radius 11 which is directed at an angle of 90° to the longitudinal axis 15 of the extruder 5. If the implement 3 moves further downwards or upwards, then the distance becomes larger again. At the edges of the intake aperture 80, the distance is at a maximum when the intake aperture 80 is situated with its length, as in FIG. 2, symmetrically to the 90° radius 11.

The distances mb, ms and the setting angle γ have not been drawn in in FIGS. 3 and 4. FIGS. 3 and 4 serve primarily to illustrate the connection possibilities of the extruder.

FIG. 3 shows an alternative embodiment in which the extruder 5 is attached to the container 1 not tangentially but instead by its end 7. The screw 6 and the housing 16 of the extruder 5 are adapted in the region of the aperture 8 to the shape of the inner wall of the container 1, and are offset backwards so as to be flush. No part of the extruder 5 protrudes through the aperture 8 into the space within the container 1.

The distance 18 here corresponds to about 5 to 10% of the radius 11 of the container 1 and to about half of the internal diameter d of the housing 16. This embodiment therefore represents the second limiting case or extreme value with the smallest possible offset or distance 18, where the direction 12 of rotation or of movement of the mixing and/or comminution implements 3 is at least slightly opposite to the direction 17 of conveying of the extruder 5, and specifically across the entire area of the aperture 8.

The scalar product in FIG. 3 at that threshold point 20 situated furthest upstream is precisely zero, where this is the point located at the edge that is associated with the aperture 8 and situated furthest upstream. The angle α between the direction vector 17 for the direction of conveying and the direction vector for the direction 19 of rotation, measured at point 20 in FIG. 3, is precisely 90°. If one proceeds further downwards along the aperture 8, i.e. in the direction 12 of rotation, the angle between the direction vectors becomes ever greater and becomes an obtuse angle >90°, and at the same time the scalar product becomes negative. However, at no point, or in no region of the aperture 8, is the scalar product positive, or the angle smaller than 90°. No local overfeed can therefore occur even in a subregion of the aperture 8, and no detrimental excessive stuffing effect can occur in a region of the aperture 8.

This also represents a decisive difference in relation to a purely radial arrangement, since there would be an angle α<90° at point 20 or at the edge 20' in a fully radial arrangement of the extruder 5, and those regions of the aperture 8 situated, in the drawing, above the radius 11 or upstream thereof or on the inflow side thereof would have a positive scalar product. It would thus be possible for locally melted plastics product to accumulate in these regions.

FIG. 4 depicts another alternative embodiment in which the extruder 5 is somewhat further offset than in FIG. 3 on the outflow side, but still not tangentially as in FIGS. 1 and 2. In the present case, as also in FIG. 3, the rearward imaginary continuation of the longitudinal axis 15 of the extruder 5 passes through the space within the container 1 in the manner of a secant. As a consequence of this, the aperture 8 is—measured in the circumferential direction of the container 1—wider than in the embodiment according to FIG. 3. The distance 18 is also correspondingly greater than in FIG. 3, but somewhat smaller smaller than the radius 11. The angle α measured at point 20 is about 150°, and the stuffing effect is therefore reduced in comparison with the apparatus of FIG. 3; this is more advantageous for certain sensitive polymers. The inner wall of the housing 16 or the right-hand-side inner edge, as seen from the container 1, is tangential to the container 1, and therefore, unlike in FIG. 3, there is no obtuse transitional edge. At this point that is associated with the aperture 8 and situated furthest downstream, on the extreme left-hand side in FIG. 4, the angle is about 180°.

The invention claimed is:

1. An apparatus for the pretreatment and subsequent conveying, plastification or agglomeration of plastics, in particular of thermoplastics waste for recycling purposes, the apparatus comprising a container (1) for a material to be processed, where the arrangement has, in the container (1), at least one mixing and/or comminution implement (3) which rotates around an axis (10) of rotation and which is intended for the mixing, heating and optionally comminution of the plastics material, where the mixing and/or comminution implement (3) comprises implements and/or blades (14), which with their frontal edges (22), in the direction (12) of rotation or movement, have a mixing, comminuting, cutting and/or heating effect on the plastics material, where an aperture (8) through which the pretreated plastics material can be removed from the interior of the container (1) is formed in a side wall (9) of the container (1) in the region of the level of the, or of the lowest, mixing and/or comminution implement (3) that is closest to a base, where at least one conveyor (5), is provided to receive the pretreated material, and has at least one screw (6) which rotates in a housing (16) and which in particular has a plastifying or agglomerating action, where the housing (16) has, located at its end (7) or in its jacket wall, an intake aperture (80) for the material to be received by the screw (6), and there is connection between the intake aperture (80) and the aperture (8), wherein an imaginary continuation of the central longitudinal axis (15) of conveyor (5) or of the screw (6) closest to the intake aperture (80), in a direction opposite to the direction (17) of conveying of the conveyor (5), passes, and does not intersect, the axis (10) of rotation, there being, on the outflow side or downstream in the direction (12) of rotation or of movement of the mixing and/or comminution implement (3), an offset distance (18) between the longitudinal axis (15) of the conveyor (5) or of the screw (6) closest to the intake aperture (80), and the radius (11) of the container (1) that is parallel to the longitudinal axis (15) and that proceeds outwards from the axis (10) of rotation of the mixing and/or comminution implement (3) in the direction (17) of conveying of the conveyor (5), and wherein a setting angle (γ) measured in degrees, of the radially outermost mixing and/or comminution implement (3), closest to the base, or of the radially outermost implement and/or blade (14) complies with the following relationship:

$$\gamma = k*d + K,$$

where
d is the diameter of the screw (6) in mm,
K is a factor in the range from 15 to 35,
k is a factor in the range from 0.08 to 0.2, where the setting angle (γ) is measured at the radially outermost point (23) of the mixing and/or comminution implement (3), closest to the base, or of the implement and/or blade (14), that is, between the continuation (24) of the, in particular straight, frontal edge (22) and the radius (11) running through the point (23), and wherein a ratio of a length (L) of the screw (6), measured from an edge (20') situated downstream in the direction of conveying of the screw (6), or from a point (20) of the intake aperture (80), situated furthest downstream, to the end of the screw (6) or to the first discharge aperture (30) in the housing (16) for the melt situated furthest upstream in relation to the direction of conveying of the screw (6) at the distal end (31) of the screw (6) remote from the container, to the nominal diameter (d) of the screw (6) is ≥7.

2. The apparatus according to claim 1, wherein the setting angle γ lies in the range from 20° to 60°.

3. The apparatus according to claim 1, wherein the setting angle (γ) measured in degrees complies with the following relationship:

$$\gamma = k1*D_B + K1,$$

where
$D_B$ is the internal diameter in mm of the cylindrical cutter compactor or container (1) with circular cross section or the internal diameter in mm of an imaginary cylindrical container (1) with circular cross section which is of the same height and is calculated to have the same volume capacity,
K1 is a factor in the range from 12 to 40,
k1 is a factor in the range from 0.005 to 0.015.

4. The apparatus according to claim 1, wherein the setting angle (γ) for containers (1) having a diameter ($D_B$) smaller than 750 mm lies in the range from 20° to 35°.

5. The apparatus according to claim 1, wherein the setting angle (γ) for containers (1) having a diameter ($D_B$) of 750 mm to 1300 mm lies in the range from 28° to 47°.

6. The apparatus according to claim 1, wherein the setting angle (γ) for containers (1) having a diameter ($D_B$) greater than 1300 mm lies in the range from 35° to 55°.

7. The apparatus according to claim 1, wherein a radial distance of the implement (mb), measured from the radially outermost point (23) of the mixing and/or comminution implement (3), closest to the base, or implements and/or blades (14) provided there, or from the described circle defined by this point (23), as far as the inner surface of the side wall (9) of the container (1), complies with the following relationship:

$$mb = k3*D_B,$$

where
$D_B$ is the internal diameter in mm of a cylindrical container (1) with circular cross section or the internal diameter in mm of an imaginary cylindrical container with circular cross section which is of the same height and is calculated to have the same volume capacity, and
k3 is a constant in the range from 0.006 to 0.16,
where the radial distance of the implement (mb) preferably lies in the range from 15 mm to 120 mm.

8. The apparatus according to claim 7, wherein with a setting angle (γ) in the range from 20° to 33° the minimum radial distance of the implement (mb) lies in the range from 15 mm to 20 mm and/or wherein with a setting angle (γ) in the range from 45° to 60° the minimum radial distance of the implement (mb) is greater than or equal to 35 mm.

9. The apparatus according to claim 1, wherein a smallest possible distance (ms) between the implement (3) and the screw (6) is described by the following relationship:

$$ms \leq k2*d + K2,$$

where
d is the diameter of the screw (6) in mm,
K2 is a factor in the range from 20 to 100,
k2 is a factor in the range from 0.03 to 0.4,
where the distance (ms) is measured between the radially outermost point (23) of the lowermost mixing and/or comminution implement (3), closest to the base, or implements and/or blades (14) provided there, and a point located on the envelope of the screw (6) closest to the intake aperture (80), that is, along a radius (11) that issues from the axis (10) of rotation and passes through the aperture (8) and the intake aperture (80), where the distance (ms) lies in the range from 15 mm to 150 mm.

10. The apparatus according to claim 1, wherein on the same horizontal plane there is provided at least one, further implements or blades (14) situated further inwards radially, where the setting angle of each implement or blade (14), measured at their respective radially outermost points, between the continuation (24) of their, in particular straight, frontal edges (22) and the radius (11) running though this point is in each case smaller than the setting angle of the adjacent implement or blade (14) situated further outwards, where the setting angle of the implement or blade (14) located furthest inside radially lies in the range from 0° to 30°.

11. The apparatus according to claim 1, wherein, for a conveyor (5) in contact with the container (1), a scalar product of the direction vector that is associated with the direction (19) of rotation and that is tangential to the circle described by the radially outermost point of the mixing and/or comminution implement (3) or that is tangential to the plastics material transported past the aperture (8) and that is normal to a radius (11) of the container (1) and that points in the direction (12) of rotation or of movement of the mixing and/or comminution implement (3) and of the direction vector (17) that is associated with the direction of conveying of the conveyor (5) at each individual point or in the entire region of the aperture (8) or immediately radially in front of the aperture (8) is zero or negative.

12. The apparatus according to claim 1, wherein an angle ($\alpha$) included between the direction vector that is associated with the direction (19) of rotation of the radially outermost point of the mixing and/or comminution implement (3) and the direction vector (17) that is associated with the direction of conveying of the conveyor (5) is greater than or equal to 90° and smaller than or equal to 180°, measured at the point of intersection of the two direction vectors (17, 19) at the inflow-side edge (20') that is associated with the aperture (8) and that is situated upstream in relation to the direction (12) of rotation or of movement of the mixing and/or comminution implement (3).

13. The apparatus according to claim 1, wherein an ($\beta$) included between the direction vector (19) that is associated with the direction (12) of rotation or of movement and the direction vector (17) that is associated with the direction of conveying of the conveyor (5) is from 170° to 180°, measured at the point of intersection of the two direction vectors (17, 19) in the middle of the aperture (8).

14. The apparatus according to claim 1, wherein a distance (18) is greater than or equal to half of the internal diameter of the housing (16) of the conveyor (5) or of the screw (6), and/or greater than or equal to 7% of the radius of the container (1), or wherein the distance (18) is greater than or equal to the radius of the container (1).

15. The apparatus according to claim 1, wherein the imaginary continuation of the longitudinal axis (15) of the conveyor (5) in a direction opposite to the direction of conveying is arranged in the manner of a secant in relation to the cross section of the container (1), and, at least in sections, passes through the space within the container (1).

16. The apparatus according to claim 1, wherein the conveyor (5) is attached tangentially to the container (1) or runs tangentially in relation to the cross section of the container (1), or wherein the longitudinal axis (15) of the conveyor (5) or of the screw (6) or the longitudinal axis of the screw (6) closest to the intake aperture (80) runs tangentially with respect to the inner side of the side wall (9) of the container (1), or the inner wall of the housing (16) does so, or the envelope of the screw (6) does so, where a drive is connected to the end (7) of the screw (6), and that the screw provides conveying, at its opposite end, to a discharge aperture, in particular an extruder head, arranged at the end of the housing (16).

17. The apparatus according to claim 1, wherein there is immediate and direct connection between the aperture (8) and the intake aperture (80), without substantial separation, in particular without transfer section or conveying screw.

18. The apparatus according to claim 1, wherein the mixing and/or comminution implement (3) comprises implements and/or blades (14) which, in the direction (12) of rotation or of movement, have a comminuting, cutting and heating effect on the plastics material, where the implements and/or blades (14) are arranged or formed on or at a rotatable implement carrier (13) which is in particular a carrier disc (13) and which is arranged parallel to a basal surface (2).

19. The apparatus according to claim 1, wherein the manner of formation, set-up, curvature and/or arrangement of the frontal regions or frontal edges (22) that are associated with the mixing and/or comminution implements (3) or with the blades (14), act on the plastics material and point in the direction (12) of rotation or of movement differs when comparison is made with the regions that, in the direction (12) of rotation or of movement, are at the rear or behind.

20. The apparatus according to claim 1, wherein the container (1) is in essence cylindrical with circular cross section and with a level basal surface (2) and with, orientated vertically in relation thereto, a side wall (9) which has the shape of the jacket of a cylinder, and/or the axis (10) of rotation of the mixing and/or comminution implements (3) coincides with the central axis of the container (1), and/or the axis (10) of rotation or the central axis are orientated vertically and/or normally in relation to the basal surface (2).

21. The apparatus according to claim 1, wherein the lowest implement carrier (13) or the lowest of the mixing and/or comminution implements (3) and/or the aperture (8) are arranged close to the base at a small distance from the basal surface (2), in particular in the region of the lowest quarter of the height of the container (1), wherein the small distance is preferably at a distance of from 10 mm to 400 mm from the basal surface (2).

22. The apparatus according to claim 1, wherein the conveyor (5) is a single-screw extruder (6) with a single compression screw (6), or is a twin- or multiscrew extruder, where the diameters d of the individual screws (6) are all identical.

23. The apparatus according to claim 1, wherein the ratio of the length (L) of the screw (6), measured from the edge (20') situated downstream in the direction of conveying of the screw (6), or from the point (20) of the intake aperture (80), situated furthest downstream, to the end of the screw (6) or to the first discharge aperture (30) in the housing (16) for the melt situated furthest upstream in relation to the direction of conveying of the screw (6) at the distal end (31) of the screw (6) remote from the container, to the nominal diameter (d) of the screw (6) is ≥10.

24. The apparatus according to claim 1, wherein the at least one conveyor is at least one extruder.

25. The apparatus according to claim 2, wherein the setting angle $\gamma$ lies in the range from 30° to 50°.

26. The apparatus according to claim 7, wherein the radial distance of the implement (mb) lies in the range from 20 mm to 80 mm.

27. The apparatus according to claim 9, wherein K2 is the factor in the range from 20 to 80.

28. The apparatus according to claim 9, wherein k2 is the factor in the range from 0.04 to 0.25.

29. The apparatus according to claim 12, wherein the angle ($\alpha$) is measured at the point (20) that is on the said edge or on the aperture (8) and is situated furthest upstream.

30. The apparatus according to claim 14, wherein the distance (18) is greater than or equal to half of the internal diameter of the housing (16) of the conveyor (5) or of the screw (6), and/or greater than or equal to 20%, of the radius of the container (1), or wherein the distance (18) is greater than or equal to the radius of the container (1).

* * * * *